US00RE33787E

United States Patent [19]

Yoshikawa

[11] E Patent Number: Re. 33,787

[45] Reissued Date of Patent: Jan. 7, 1992

[54] FOUR-CYCLE ENGINE

[75] Inventor: Masaaki Yoshikawa, Iwata, Japan

[73] Assignee: Yamaha Hatsudoki Kabushiki Kaisha, Iwata, Japan

[21] Appl. No.: 342,945

[22] Filed: Apr. 25, 1989

Related U.S. Patent Documents

Reissue of:

[64] Patent No.: 4,660,529
Issued: Apr. 28, 1987
Appl. No.: 369,665
Filed: Apr. 19, 1982

[30] Foreign Application Priority Data

Apr. 22, 1981 [JP] Japan ..... 56-61843
Dec. 28, 1981 [JP] Japan ..... 56-214218

[51] Int. Cl.[5] ..... F02M 35/10

[52] U.S. Cl. ..... 123/432; 123/90.27; 123/315

[58] Field of Search ..... 123/90.22, 90.23, 90.27, 123/90.39, 90.44, 193 H, 308, 315, 302, 432

[56] References Cited

U.S. PATENT DOCUMENTS

| | | | |
|---|---|---|---|
| 1,427,190 | 8/1922 | Brown | 123/90.27 X |
| 1,484,376 | 2/1924 | Lanzerotti-Spina | 123/90.22 |
| 2,054,928 | 9/1936 | Church | 123/182 |
| 2,144,561 | 1/1939 | Buchi | 123/308 X |
| 3,211,137 | 10/1965 | Love | 123/432 |
| 4,319,548 | 3/1982 | Kruger | 123/90.27 |

FOREIGN PATENT DOCUMENTS

| | | | |
|---|---|---|---|
| 0127171 | 4/1948 | Australia | 123/308 |
| 0755495 | 10/1954 | Fed. Rep. of Germany . | |
| 0953672 | 12/1956 | Fed. Rep. of Germany | 123/90.27 |
| 1401239 | 12/1968 | Fed. Rep. of Germany . | |
| 2342530 | 5/1974 | Fed. Rep. of Germany . | |
| 2853576 | 7/1979 | Fed. Rep. of Germany | 123/308 |
| 2836833 | 4/1980 | Fed. Rep. of Germany . | |
| 2919213 | 11/1980 | Fed. Rep. of Germany | 123/90.27 |
| 0019901 | 2/1980 | Japan | 123/432 |
| 242919 | 11/1925 | United Kingdom . | |
| 0296125 | 8/1928 | United Kingdom | 123/90.27 |
| 0687528 | 2/1953 | United Kingdom | 123/315 |

OTHER PUBLICATIONS

MTZ,41, Manfred Tholl, "EIN 16-Ventilmotor von Opel", 10-1980, pp. 427 to 434.

Sport, 8/1988, "Weltrekorde, Audi 200 Turbo Quattro", pp. 312 & 313.

MTZ, 38, 1-1977, p. 363.

Nowitzki, Hans, "Only Valve in Head", Motorrad, 11/1980, pp. 155-156.

*Primary Examiner*—Willis R. Wolfe
*Attorney, Agent, or Firm*—Ernest A. Beutler

[57] ABSTRACT

Several embodiments of cylinder head and valve train configurations for an overhead valve internal combustion engine that permits increased valve area without interference and while maintaining simplified valve actuation. In each embodiment one pair of valves is operated by one cam shaft and lies on one side of a plane containing the axis of the cylinder. Three other valves are positioned primarily on the other side of the plane and reciprocate about axes that are not parallel with each other. These axes, however, intersect so that each of these three valves may be operated by the same cam shaft. In one embodiment of the invention the intersection of the valves axis is coincident with the axis of rotation of the respective cam shaft so as to permit direct actuation of the valves. In another embodiment the intersection lies substantially along a plane that intersects the stems of the valves when they are closed to facilitate operation of multiple valves from a single cam lobe by means of a single rocker arm.

86 Claims, 6 Drawing Sheets

FOUR-CYCLE ENGINE

Matter enclosed in heavy brackets [ ] appears in the original patent but forms no part of this reissue specification; matter printed in italics indicates the additions made by reissue.

BACKGROUND OF THE INVENTION

This invention relates to a four-cycle engine and more particularly to an improved valve and combustion chamber arrangement for such an engine.

As is well known, the performance of a four-cycle engine may be improved through the use of multiple intake and/or exhaust valves. By using multiple valves, the valve area communicating with each chamber may be increased. The use of multiple valves permits an increased valve area without increasing the inertia of individual valve components as would be true if merely larger valves were employed. Hence, higher engine speeds may be attained through the use of multiple valves. In addition, the use of multiple valves permits a greater valve area in a given combustion chamber area. The use of multiple valves, however, does present some difficulties. As a number of valves in a given chamber is increased, it is necessary to place the valves so that they do not interfere with each other during their opening and closing movement. In addition, the use of a greater number of valves may complicate the actuating system for the valves.

It is, therefore, a principal object of this invention to provide an improved and simplified multiple valve arrangement for an internal combustion engine.

It is a further object of the invention to provide a multiple valve arrangement wherein more than one valve is operated by the same cam shaft.

It is desirable to provide a direct valve actuation wherein the cam lobes act directly on the valves to operate them. Such an arrangement reduces the complexity of the valve train and further permits higher speeds due to the lower inertia. However, where multiple valves are employed, and particularly if a greater number of valves than two for either the intake or exhaust are employed, it has been difficult if not impossible to provide such direct action on all valves.

It is, therefore, yet a further object of this invention to provide a combustion chamber for an engine that permits the use of multiple, directly actuated valves.

SUMMARY OF THE INVENTION

A first feature of this invention is adapted to be embodied in a valve train for an internal combustion engine that comprises a cam shaft and a plurality of valves operated by the cam shaft, at least two of which communicate with the same chamber of the engine. In accordance with this feature of the invention, the two valve reciprocate about respective axes that are not parallel to each other.

Another feature of the invention is also adapted to be embodied in a valve train for an internal combustion engine. In accordance with this feature of the invention, the valve train includes a cam shaft and at least three valves operated by the cam shaft and which communicate with the same chamber of the engine. In accordance with this feature of the invention, the three valves each reciprocate about a respective axis and the axis of one of the valves is not parallel to the axes of the remaining valves.

Yet another feature of this invention is adapted to be embodied in a combustion chamber for a reciprocating engine. In accordance with this feature of the invention, a cylinder head forms a closure for a cylinder bore and defines at least in part the engine combustion chamber. The cylinder head is configured with at least two valves of the same function that lie on one side of a plane containing the axis of the cylinder bore. At least three valves of a different function also lie within the combustion chamber. One of these three valves is positioned further from the plane than the other two valves and these three valves lie predominantly on the other side of the [plan] *plane* than the first two mentioned valves.

When the valves are described in the specification and claims thereof as being of "the same function," this is intended to refer to the valves as being either all intake valves or all exhaust valves. When the term "different function" is employed herein, it is intended to refer to exhaust valves if the "same function" valves are intake valves, or intake valves if the "same function" valves are exhaust valves.

Yet another feature of the invention is adapted to be embodied in a valve train for an internal combustion engine having a cam shaft and a plurality of valves operated by the same shaft. In accordance with this feature of the invention, the cam shaft is provided with a single lobe for operating *a* plurality of valves. A single rocker arm is provided and is supported for pivotal movement with a follower portion adapted to be engaged by the cam lobe for pivoting the rocker arm. The rocker arm has individual finger portions adapted to cooperate with each of the valves for operating the valves upon pivotal movement of the rocker arm.

DETAILED DESCRIPTION OF THE PREFERRED EMBODIMENTS

Embodiment of FIGS. 1 through 4

Figure 1:
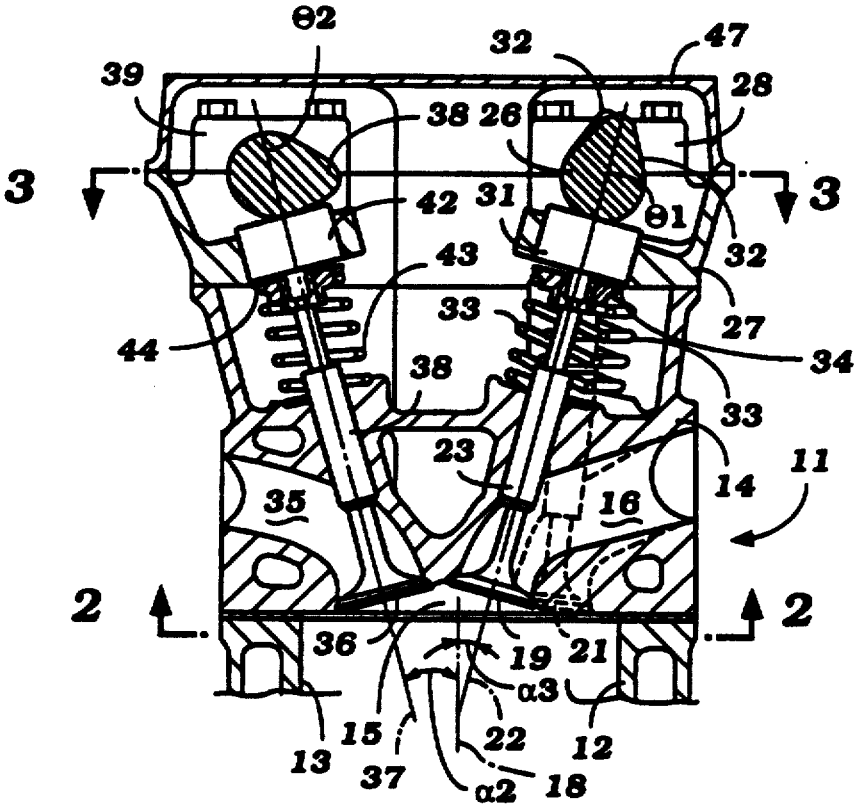
FIG. 1 is a cross-sectional view taken through a single cylinder of a multiple cylinder internal combustion engine employing this invention, and is taken generally along the line 1—1.

In FIGS. 1 through 4 the reference numeral 11 indicates generally an in-line four-cycle internal combustion engine constructed in accordance with a first embodiment of the invention. Although all embodiments of the invention are described in conjunction with an engine of this cylinder number and configuration, it should be readily apparent that this invention is adapted to be employed with [engine] *engines* of other cylinder numbers and of other configurations. Since the invention is directed primarily toward the valve train and combustion chamber configuration, only this portion of the engine has been illustrated in detail, and for the same reason only the [constructed] *construction* associated with one of the cylinders in each embodiment will be described.

The engine includes a cylinder block 12 that is formed with cylinder bores 13. Pistons (not shown) are supported for reciprocation in the cylinder bores 13 and drive the crankshaft (which is also not shown) in a known manner. A cylinder head 14 is affixed to the cylinder block 12 in a known manner. The cylinder head 14 is formed with individual cavities 15 that cooperate with the cylinder bores 13 and respective pistons. At times the cavities 15 will be referred to as the combustion chamber.

The cylinder head 14 is formed with intake passages that communicate with each combustion chamber 15. The intake passages consist of pairs of first intake passages 16 that extend through an intake side of the cylinder head 14 and which terminate at respective intake ports. The passages 16 are configured as shown in FIG. 1. Between the intake passages 16, the cylinder head 14 is formed with a third intake passage 17 for each combustion chamber 15. The intake passage 17 also terminates at an intake port. As will be [desribed] *described* the intake port associated with the passage 17 is disposed between the ports formed by the passages 16 and is disposed outwardly of a plane 18 that contains the axis of the cylinder bore 13.

Figure 2:
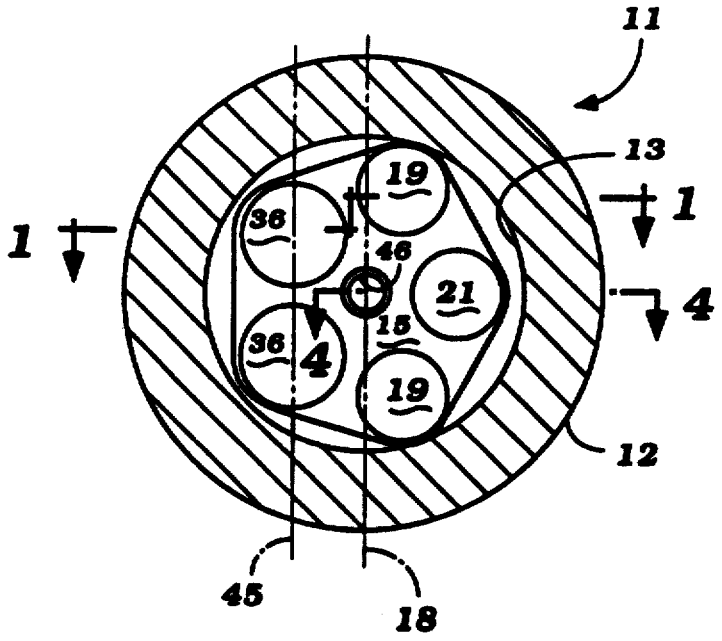
FIG. 2 is a cross-sectional view taken along the line 2—2 of FIG. 1, and also shows generally the combustion chamber configuration.
Figure 3:
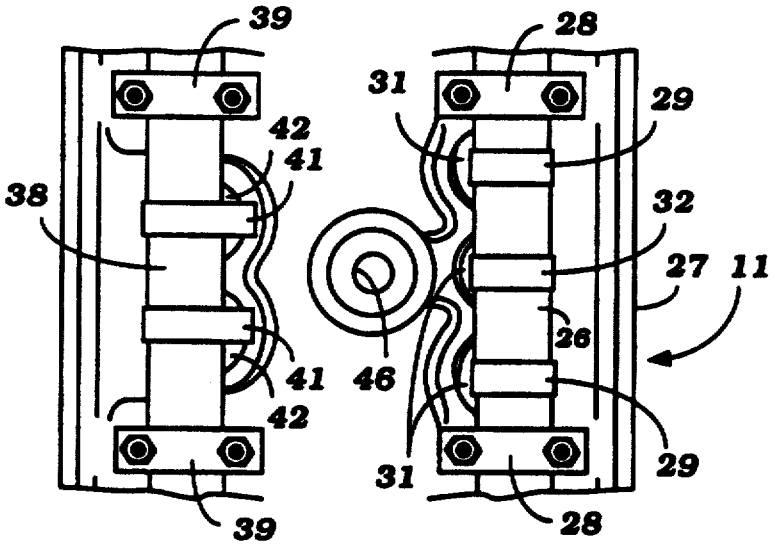
FIG. 3 is a partial cross-sectional view taken along the line 3—3 of FIG. 1.
Figure 4:
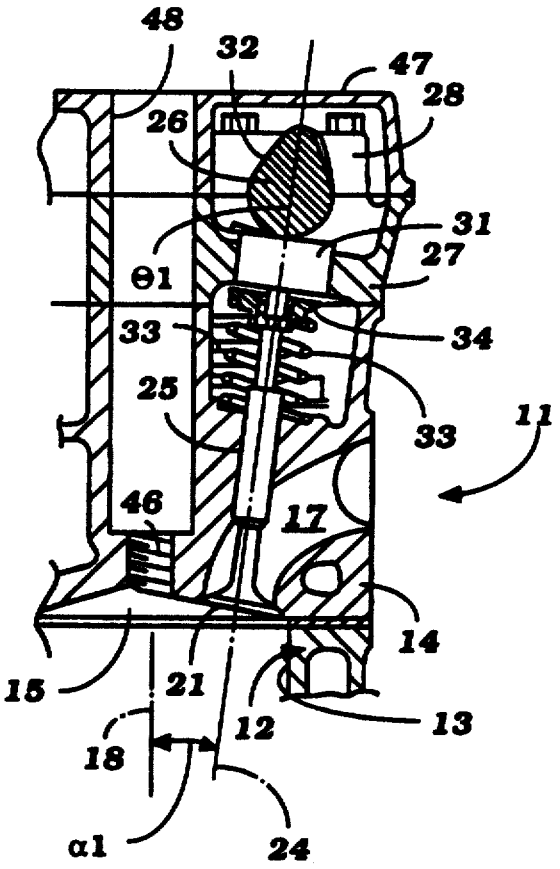
FIG. 4 is a cross-sectional view taken generally along the line 4—4 of FIG. 2.
Figure 5:
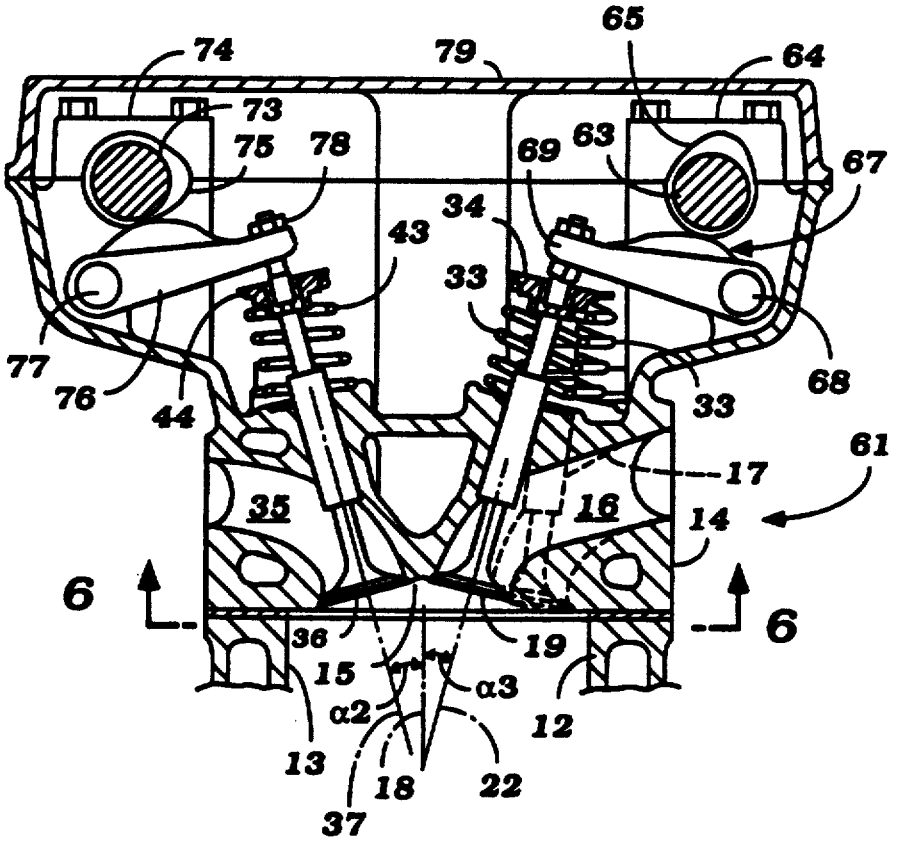
FIG. 5 is a cross-sectional view, in part similar to FIG. 1, and is taken generally along the line 5—5 of FIG. 6, showing another embodiment of the invention.
Figure 6:
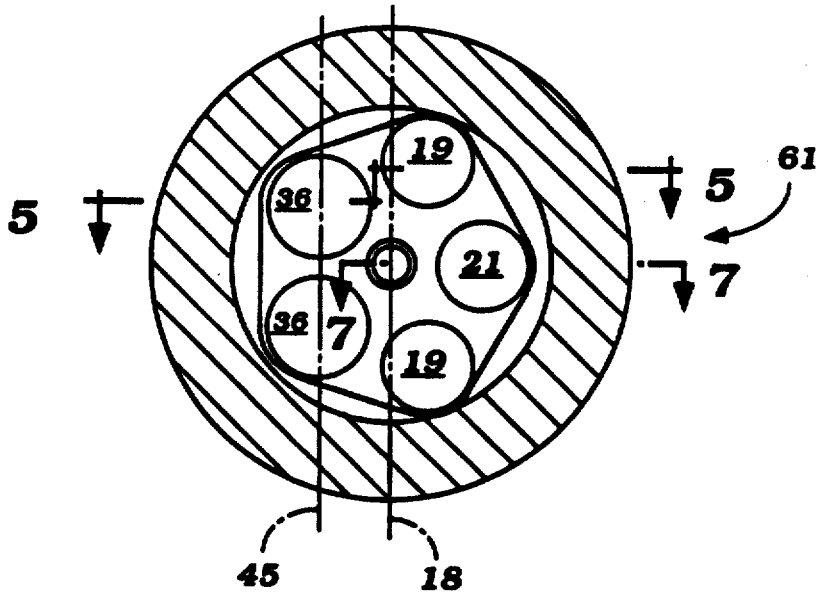
FIG. 6 is a cross-sectional view taken along the line 6—6 of FIG. 5.
Figure 7:
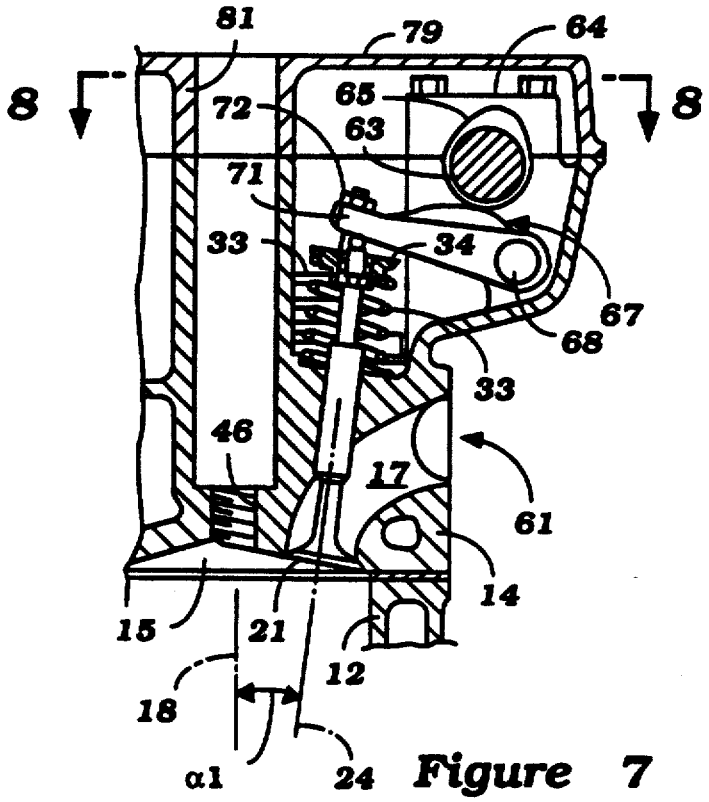
FIG. 7 is a cross-sectional view taken along the line 7—7 of FIG. 6.
Figure 8:
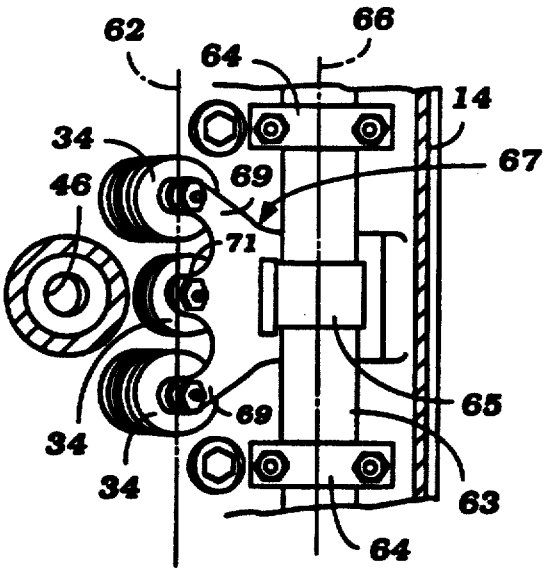
FIG. 8 is a cross-sectional view taken along the line 8—8 of FIG. 7.

Intake valves 19 cooperate with valve seats formed in the intake ports associated with the intake passages 16 so as to control the flow of intake charge into the combustion chamber 15. An intake valve 21 cooperates with a valve seat formed at the intake port associated with the intake passage 17. The intake valves 19 reciprocate along respective parallel axes, indicated by the line 22 (FIG. 2). The intake valves 19 are supported for reciprocation along the axes 22 by valve guides 23 that are pressed into the cylinder head 14. The intake valve [22] *21* for each cylinder 13 reciprocates along an axis 24 (FIG. 4) as defined by a valve guide 25 that is also pressed into the cylinder head 13. The axis 24 is not parallel to the axis 22 for a reason to be described.

The axes 22 and 24 all intersect the axis of rotation $0_1$ of an intake cam shaft, indicated generally by the reference numeral 26. The intake cam shaft 26 is supported for rotation in a cam tower 27 that is affixed to the cylinder head 14 in a known manner. Bearing caps 28 are affixed at spaced locations to the cam tower 27 and cooperate with the cam tower to journal the intake cam shaft 26. Because the intake valve axes 22 and 24 intersect the axis of rotation $0_1$ of the cam shaft 26, it is possible to directly operate each of the intake valves 19 and 21. The cam shaft 26 is provided with a first pair of lobes 29 that engage tappet followers 31 that are reciprocally supported in the valve tower 27 and which contact the stems of the intake valves 19 for their direct actuation. The cam [shaft] *29* is also provided with a lobe 32 between the lobes which cooperates with a tappet follower 31 for directly actuating the intake [valves] *valve* 21.

Valve springs 33 encircle each of the intake valves 19 and 21 and act against keeper spring retainer assemblies 34 [of] *for* urging the valves 19 and 21 to their closed positions.

The reciprocal axes 22 of the intake valves 19 lie at an angle $\alpha_3$ to the plane 18 (FIG. 1). The axis 24 of the intake valves 21 lie at an angle $\alpha_1$ to the plane 18. The angle $\alpha_1$ is [greater] *less* than the angle $\alpha_3$. That is, the axes 22 of the intake valves 19 are at a [lesser] *greater* angle to the cylinder bore axis than is the axis 24 associated with the intake valve 21. As a result, the intake valve 21 is spaced radially outwardly from the plane 18 toward the periphal edge of the cylinder bore 13, as clearly shown in FIG. 2. This arrangement permits the three intake valves 19, 21 all to reciprocate between their open and closed positions without interference with each other, while at the same time maximizing intake valve area. Due to this different angle relative to the cam shaft rotational axis $0_1$, the cam lobe 32 is advanced relative to the cam lobes 29 so that all intake valves 19 and 21 will be operated simultaneously. Of course, if desired, a different valve timing might be employed. Since the axes 22 and 24 all intersect the cam shaft axis $0_1$, it is possible to operate more than two intake valves from the same cam shaft.

Exhaust passages 35 extend through the side of the cylinder head 14 opposite to the intake passages 16 and 17. There are a pair of exhaust passages 35 associated with each cylinder bore 13 in connection with the embodiment. The exhaust passages 35 terminate in exhaust ports and valve seats. Exhaust valves 36 cooperate with the valve seats and exhaust ports for controlling the communication of the combustion chamber 15 with exhaust passages 35. The exhaust valves 36 are supported for reciprocation about respective axes 37 by means of valve guides 38 that are pressed into the cylinder head 14. The exhaust valve axes 37 lie at angle $\alpha_2$ to the plane 18. The angle $\alpha_2$ is [lss] *greater* than the angle $\alpha_1$ of the intake valves 21 but [greater] *less* than the angle $\alpha_3$ of the intake valves 19.

The exhaust valve axes 37 intersects the axis of rotation $0_2$ of an exhaust cam shaft 38. The exhaust cam shaft 38 is rotatably journaled in the cam tower 27 *and* is journaled by the cam tower 27 and bearing caps 39 that are affixed in a known manner to the valve tower 27. Because the axes 37 intersects the exhaust cam axes $0_2$ it is possible to directly actuate the exhaust valves 36. For this purpose the exhaust cam shaft 38 is provided with lobes 41 that engage tappet followers 42 which, in turn, directly actuate the exhaust valves 36.

Valve springs 43 encircle the exhaust valves 36 and engage keeper spring retainer assemblies 44 for urging the exhaust valves 36 to their closed position.

As may be readily seen from FIG. 2, the centers of the exhaust valves 36 lie on a plane 45 that is offset from the plane 18 on the side opposite the intake valves 19 and 21.

A threaded spark plug opening 46 is formed in the cylinder head 14 on the plane 18 and at the center of the respective cylinder bore 13. A cam shaft cover 47 is affixed in any suitable manner to the cam tower 27 so as to enclose the cam shafts 26 and 38. The cover 47 is formed with openings 48 that are aligned with the spark plug openings 46 to permit insertion and removal of the spark plugs.

Embodiment of FIGS. 5 through 8

An engine constructed in accordance with a second embodiment of this invention is identified [generaly] *generally* by the reference numeral 61. The engine 61 has its intake and exhaust valves and intake and exhaust ports arranged as in the embodiment of FIGS. 1 through 4. Thus, these components have been identified by the same reference numeral and a detailed description of similar components will not be repeated. This embodiment differs from the embodiment of FIGS. 1 through 4 in that the intake and exhaust valves 19, 21 and 36 are not directly actuated by the cam shafts. Rather, the valves 19, 21 and 36 are operated by rocker followers, as will be described.

The axes of reciprocation 22 of the intake valves 19 are, as in the previously described embodiment, parallel to each other and lie at angle $\alpha_3$ to the plane 18. The axis of reciprocation 24 of the intake valve 21 lies at angle $\alpha_1$ to the plane 18, also as in the previously described embodiment. As in the previously described embodiment, the axes 22 and 24 all intersect along a line. However, in this embodiment the line of intersection is not coincident with the axis of rotation of the actuating cam shaft. Rather, in this embodiment the axes of reciprocation 22 and 24 intersect along a line 62 (FIG. 8) which generally lies along the center portion of the stems of the valves 19 and 21 when these valves are in their closed positions.

In this embodiment an intake cam shaft 63 is rotatably supported directly in the cylinder head 14 by means of bearings formed in the cylinder head 14 and bearing caps 64 that are affixed to the cylinder head 14. In accordance with this embodiment of the invention, the intake cam shaft 63 has only a single lobe 65 for operating all of the intake valves 19 and 21 associated with each cylinder bore 13. In this embodiment the axis of rotation of the cam shaft 63, which axis is identified by the line 66 (FIG. 8), is disposed outwardly from the plane 18 relative to the line 62 of intersection of the axes 22 and 24. A rocker arm assembly, identified generally by the reference numeral 67, is provided for each cylinder and is journaled in the cylinder head 14 on a respective rocker arm pivot 68. As may be readily seen from FIG. 8, the rocker arm 67 has a pair of outer finger portion 69 and a central finger portion 71. Adjusting screws and jam nuts 72 are associated with each of the finger portions 69 and 71 for coaction with the respective valve 19, 21 so as to transmit pivotal movement of the rocker arm assembly 67 into reciprocation of the respective intake valves. As is well known, the adjusting screw, jam nut assembly 72 permits adjustment of the clearance between the rocker arm 67 and the respective intake valve 19, 21.

The exhaust valves 36 are similarly operated by means of an exhaust cam shaft 73 that is journalled in the cylinder head 14 on its exhaust side by means of integral bearings and bearing caps 74. The exhaust cam 73 has individual lobes 75 that cooperate with bifurcated rocker arm assemblies, indicated generally by the reference numeral 76, which are supported on rocker arm pivots 77. Adjusting screws and jam nuts 78 transmit the pivotal movement of the rocker arms 76 into reciprocation and exhaust valves 36.

A cam cover 79 is affixed to the cylinder head 14 to enclose the valve actuating mechanism. The cam cover 79 is formed with spark plug access openings 81 to permit insertion and removal of spark plugs from the cylinder head spark plug openings 46.

Figure 9:
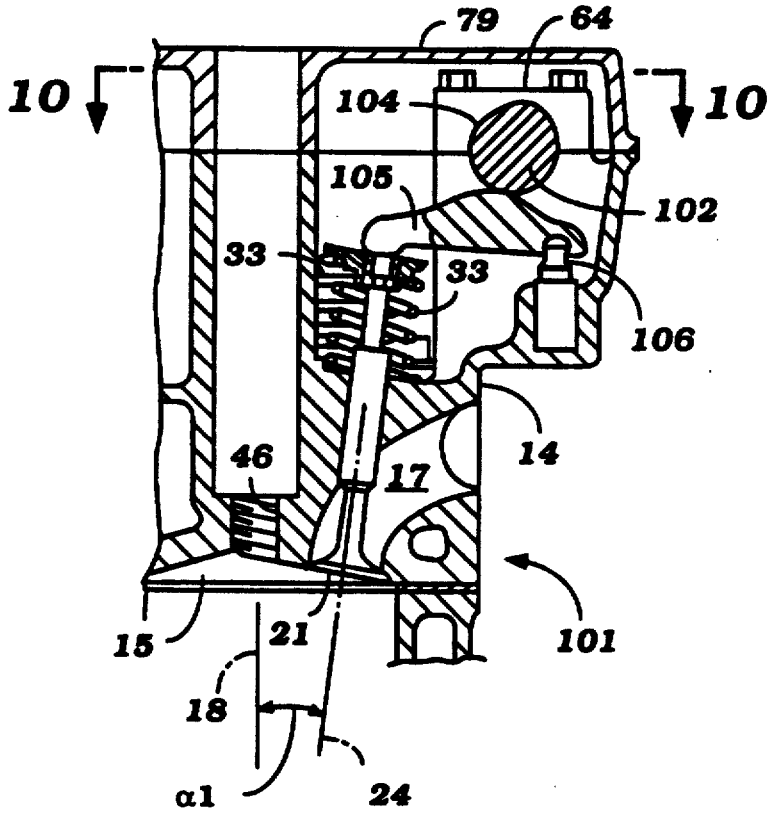
FIG. 9 is a cross-sectional view, in part similar to FIGS. 4 and 7, and shows a still further embodiment of the invention.
Figure 10:
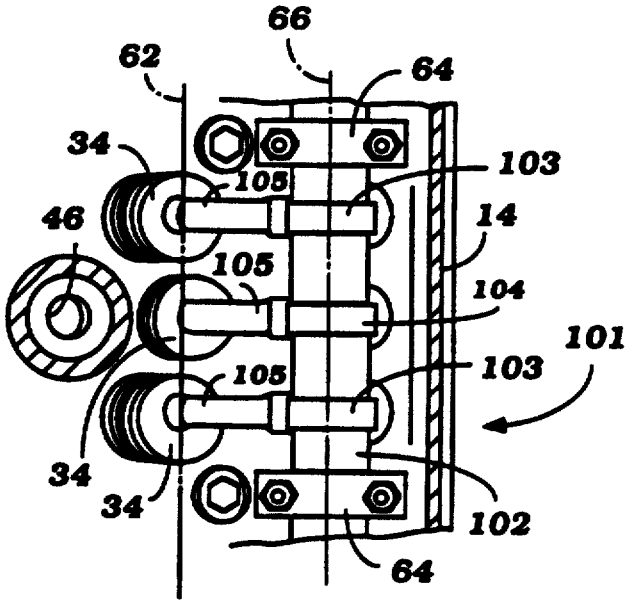
FIG. 10 is a cross-sectional view taken along the line 10—10 of FIG. 9.

Embodiment of FIGS. 9 and 10

The reference numeral 101 illustrates an internal combustion engine having a valve train constructed in accordance with a still further embodiment of the invention. As with the embodiments of FIGS. 1 through 4 and FIGS. 1 through 8, the orientation of the valves and main components are the same and for that reason these components have been identified by the same reference numerals and detailed description of them will not be repeated. Like the embodiment of FIGS. 5 through 8, the intake valves and exhaust valves of [the] *this* embodiment are operated through rocker arm assemblies rather than directly as in the embodiment of Figures 1 through 4. Thus, the axes of reciprocation of the intake valves all intersect the line 62 which lies generally along the center of the stems of the intake valves. Unlike the embodiment of FIGS. 5 through 8, however, this embodiment employs an individual rocker arm for operating each valve. Therefore, only this portion of the construction will be described in detail and reference may be had to the description of the remaining embodiment for components which are not described in this embodiment, and for that reason have been identified by the same reference numerals.

In this embodiment an intake cam shaft 102 is journaled directly by the cylinder head 14 and by bearing caps 64 that are affixed to the cylinder head 14. The intake cam shaft 102 rotates about the axis 66. In this embodiment the intake cam shaft 102 is provided with individual lobes comprising a pair of lobes 103 and an intermediate lobe 104. The lobes 103 coacts with the intake valves 19 whereas the lobe 104 cooperates with the intake valve 21.

A rocker arm 105 is provided for each intake valve 19, 21 and is supported for pivotal movement by means of a respective pivot assembly 106 carried in the cylinder head 14. Each pivot assembly 106 may constitute either a mechanically adjustable assembly of a known type or an automatic, hydraulically operated tappet assembly of any known type; thus, lash adjustment is afforded by the individual pivots 106.

The exhaust valves which are not shown in this embodiment are operated by individual rocker arm assemblies which are the same as those employed in connection with the intake valves 19, 21. For that reason, this portion of the assembly has not been illustrated, nor is description believed to be necessary.

It should be readily apparent that the described configuration permits valve area and, hence, breathing of the engine to be maximized without resulting in interference between the valves. Furthermore, by providing the offsetting of one valve relative to other valves of the same function, while maintaining intersection of their reciprocal axes at the appropriate location, it is possible to actuate all of the valves of the same function from a single cam shaft.

Figure 11:
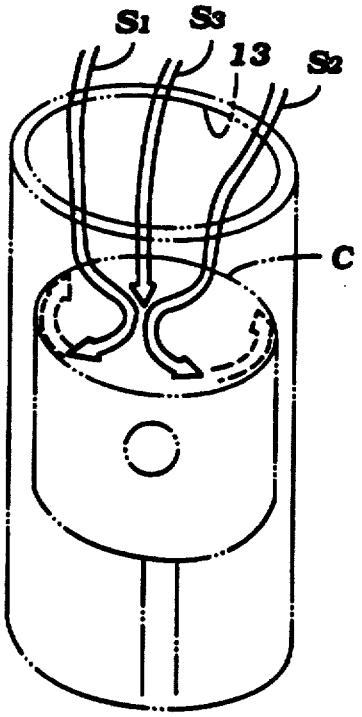
FIG. 11 is a partially schematic, perspective view showing the intake flow paths generated by the embodiments of FIGS. 1 through 4, 5 through 8, and 9 and 10.

In addition to affording a larger valve area and reduced inertia, the described valve placement also promotes more uniform charging of the cylinder and better scavenging of it. FIG. 11 is a schematic view that shows generally the flow pattern of the intake charge which would be typical of each of the described embodiments. As seen in this figure, the intake charge flowing through the intake passages 16 past the intake valves 19 generally follows the pattern of lines $S_1$ and $S_2$. The flow through the intake passage 17 past the intake valves 21 follow the path indicated by the arrow $S_3$. Because of the [lesser] *greater* inclination of the intake valves 19 to the center plane 18, the charge flowing through the intake passages 16 will impinge on the opposing portion of the cylinder wall 13 and be directed generally toward the center of the wall. The charge from the intake passage 17 will not impinge upon the cylinder wall as soon and, hence, this charge will be directed more toward the center of the cylinder bore 13. As the piston C moves upwardly, the flow from the intake passages 16, as indicated by the arrows $S_2$ and $S_2$ will impinge on the head of the piston and be redirected to flow in a generally circumferential direction to improve charge distribution within the combustion chamber 15.

In the illustrated embodiments there are three intake valves and only two exhaust valves. It is believed to be readily apparent to those skilled in the art that an arrangement may be employed with the exhaust valves similar to that employed with the intake valves so that three exhaust valves may also be utilized. Furthermore, more than three valves of each function may also be used in conjunction with the engine. Various other changes and modifications may be made without departing from the spirit and scope of the invention, as defined by the appended claims.

I claim:

1. A valve train for an internal combustion engine having a generally concave combustion chamber disposed at one end of a cylinder bore having an axis comprising an overhead cam shaft, a plurality of poppet valves having head portions and stem portions and operated by said cam shaft, at least two of said valves communicating with said combustion chamber of the engine, the improvement comprising said two valves being reciprocal about respective axes that are not parallel to each other and each of which is inclined at an acute angle to said axis of the associated cylinder bore and which intersects a plane containing said cylinder bore axis on the head side of the respective of said valves, the tips of the stems of said valves being disposed radially inwardly toward said cylinder bore axis from an axial extension of said cylinder bore, the axis of reciprocation of said valves intersecting at a common line, said common line intersects the axis of rotation of said cam shaft.

2. A valve train as set forth in claim 1 wherein the valves are directly actuated by the cam shaft and the axis of rotation of the cam shaft is disposed at a lesser distance from the cylinder bore axis [that] *than* the radius of the cylinder bore.

3. A combustion chamber configuration for an internal combustion engine defined in part by a cylinder head adapted to communicate with a cylinder bore, a pair of valves serving the same function and lying within said cylinder head on one side of a plane containing the axis of the cylinder bore, a pair of valves positioned in said cylinder head and lying substantially on the other side of said plane but having a part thereby lying on said one side of said plane and performing a different function, a third valve positioned within said cylinder head on said other side of said plane and spaced further from said plane of the said other function valves, said third valves also serving said other function.

4. A combustion chamber as set forth in claim 3 wherein the same function valves are exhaust valves and the other function valves are intake valves.

5. In a valve train for an internal combustion engine having a generally concave combustion chamber disposed at one end of a cylinder bore having an axis comprising an overhead cam shaft, a plurality of poppet valves having head portions and stems and directly operated by said cam shaft, at least two of said valves communicating with said combustion chamber of the engine, the improvement comprising said two valves being reciprocal about respective axes that are not parallel to each other and each of which is inclined at an acute angle to said axis of the associated cylinder bore and which intersects a plane containing said cylinder bore axis on the head side of the respective of said valves, the tips of the stems of said valves being disposed radially inwardly toward said cylinder bore axis from an axial extension of said cylinder bore.

6. A valve train as set forth in claim 5 wherein the plane containing the cylinder bore axis extends parallel to the axis of rotation of the cam shaft.

7. A valve train [wherein] for an internal combustion engine having a generally concave combustion chamber disposed at one end of a cylinder bore having an axis comprising an overhead cam shaft, a plurality of poppet valves having head portions and stems and directy operated by said cam shaft, at least two of said valves communicating with said combustion chamber of the engine, the improvement comprising said two valves being reciprocal about respective axes that are not parallel to each other and each of which is inclined at an acute angle to said axis of the associated cylinder bore and which intersects a plane containing said cylinder bore axis on the head side of the respective of said valves, the tips of the stems of said valves being disposed radially inwardly toward said cylinder bore axis from an axial extension of said cylinder bore, said two valves performing the same function.

8. A valve train as set forth in claim 7 wherein the two valves are both intake valves.

9. A valve train as set forth in any of claims 5, 7, or 8 wherein the axis of reciprocation of the valve intersect a common line.

10. A valve train for an internal combustion engine having a generally concave combustion chamber disposed at one end of a cylinder bore having an axis comprising an overhead cam shaft, a plurality of poppet valves having head portions and stem portions and operated by said cam shaft, at least two of said valves communicating with said combustion chamber of the engine, the improvement comprising said two valves being reciprocal about respective axes that are not parallel to each other and each of which is inclined at an acute angle to said axis of the associated cylinder bore and which intersects a plane containing said cylinder bore axis on the head side of the respective of said valves, the tips of the stems of said valves being disposed radially inwardly toward said cylinder bore axis from an axial extension of said cylinder bore, the axis of reciprocation of said valves intersecting at a common line, said common line of intersection lying substantially along the stems of said valves.

11. A valve train as set forth in claim 10 further including a single rocker arm pivotally supported by the engine and having a follower part engaged with a single lobe on the cam shaft for operating all of the valves coacting with the same chamber of the engine, said rocker arm having finger portions cooperating with each of the valves.

12. A valve train as set forth in claim 10 wherein the means for operating the valves from the cam shaft comprises a rocker arm associated with each valve and pivotally supported by the engine, and by follower means on each said rocker arm cooperating with a respective cam on the cam shaft.

13. A valve train as set forth in claim 10 wherein the two valves perform the same function.

14. A valve train as set forth in claim 10 wherein the two valves are both intake valves.

15. A valve train for an internal combustion engine comprising a cylinder bore closed by a cylinder head, a cam shaft journaled for rotation relative to said cylinder head, three poppet valves operated by said cam shaft and supported for reciprocation by said cylinder head, at least two of said valves being reciprocal about parallel axes, the third valve reciprocating about an axis that is not parallel to the axis of the first two valves, all of said axes intersect a common axis, said two of said valves having their heads disposed closer to said cylinder bore than said third valve when said valves are in their closed position, said valves all serving the same function.

16. A valve train as set forth in claim 15 wherein the common line intersects the axis of rotation of the cam shaft.

17. A valve train as set forth in claim 16 wherein the valves are directly actuated by the cam shaft.

18. A valve train as set forth in claim 15 wherein the common line of intersection lies substantially along the stems of the valves.

19. A valve train as set forth in claim 18 further including a single rocker arm pivotally supported by the engine and having a follower portion engaged with a single lobe on the cam shaft for operating all of the valves coacting with the same chamber of the engine, said rocker arm having a finger portion cooperating with each of the valves.

20. A valve train as set forth in claim 18 wherein the means for operating the valves from the cam shaft comprises a rocker arm associated with each valve and pivotally supported by the engine, and having follower means on each said rocker arm cooperating with a respective cam on the cam shaft.

21. A valve train as set forth in any of claims 15, 16, 17, 18, 19, or 20 further including a plurality of additional valves communicating with the same chamber and serving a different function.

22. A valve train as set forth in claim 21 further including a second cam shaft for operating the additional valves.

23. A valve train for [a] *an* internal combustion engine having a generally concave combustion chamber disposed at one end of a cylinder bore having an axis comprising an overhead cam shaft, a plurality of poppet valves having head portions and stem portions and operated by said cam shaft, at least two of said valves communicating with said combustion chamber of the engine, the improvement comprising said two valves being reciprocal about respective axes that are not parallel to each other and each of which is inclined at an acute angle to said axis of the associated cylinder bore and which intersects a plane containing said cylinder bore axis on the head side of the respective of said valves, the tips of the stems of said valves being disposed radially inwardly toward said cylinder bore axis from an axial extension of said cylinder bore, the axis of reciprocation of said valves intersecting at a common line, a third valve operated by the cam shaft, communicating with the combustion chamber and reciprocal about an axis parallel to the axis of one of the two first mentioned valves.

24. A valve train as set forth in claim 23 further including plurality of additional valves, the first mentioned valves serving one function and the additional valves serving another function.

25. A valve train as set forth in claim 24 wherein the additional valves are operated directly by another cam shaft.

26. A valve train as set forth in claim 25 wherein the additional valves have their heads lying on one side of a plane containing an axis of a cylinder bore forming a part of the engine chamber, the first mentioned two valves being positioned closer to said plane than the third valve, the first two mentioned valves and the third valve lying substantially on the opposite side of the plane from the additional valves.

27. A valve train as set forth in claim 23 wherein the valves all serve the same function.

28. A valve train as set forth in claim 27 wherein the axis of reciprocation of the valves intersects a common line.

29. A valve train as set forth in claim 28 wherein the common line intersects the axis of rotation of the cam shaft.

30. A valve train as set forth in claim 29 wherein the valves are directly actuated by the cam shaft.

31. A valve train as set forth in claim 28 wherein the common line of intersection lies substantially along the stems of the valves.

32. A valve train as set forth in claim 31 further including a single rocker arm pivotally supported by the engine and having a follower portion engaged with a single lobe on the cam shaft for operating all of the valves coacting with the same chamber of the engine, said rocker arm having finger portions cooperating with each of the valves.

33. A valve train as set forth in claim 31 wherein the means for operating the valves from the cam shaft comprises a rocker arm associated with each valve and pivotally supported by the engine, and having follower means on each said rocker arm cooperating with a respective cam on the cam shaft.

*34. A valve train for an internal combustion engine having a generally concave combustion chamber disposed at one end of a cylinder bore having an axis, said valve train comprising an overhead camshaft, a plurality of poppet valves having head portions and stem portions and operated by said camshaft, at least two of said valves communicating with said combustion chamber of the engine, the improvement comprising said two valves being reciprocal about respective axis that are not parallel to each other and each of which is an inclined at an acute angle to said axis of the associated cylinder bore and which intersects a plane containing said cylinder bore axis on the head side of the respective of said valves, said valves being actuated by said camshaft, the axis of rotation of said camshaft being disposed at a lesser distance from said cylinder bore axis than the radius of said cylinder bore, said valves being operated by direct actuation from said camshaft.*

*35. A valve train for an internal combustion engine as set forth in claim 34 wherein the line intersects the axis rotation of the camshaft.*

*36. A valve train for an internal combustion engine having a generally concave combustion chamber disposed at one end of a cylinder bore having an axis, said valve train comprising an overhead camshaft, a plurality of poppet valves having head portions and stem portions and operated by said camshaft, at least two of said valves communicating with said combustion chamber of the engine, the improvement comprising said two valves being reciprocal about respective axis that are not parallel to each other and each of which is an inclined at an acute angle to said axis of the associated cylinder bore and which intersects a plane containing said cylinder bore axis on the head side of the respective of said valves the stems of said valves lying on one side, of said plane, said valves being actuated by said camshaft, the axis of rotation of said camshaft being disposed on said one side of said plane at a lesser distance from said plane than the radius of said cylinder bore.*

*37. A valve train for an internal combustion engine as set forth in claim 36 wherein the axis of reciprocation of the two valves intersect along a line that extends parallel to the plane containing the cylinder bore axis.*

*38. A valve train for an internal combustion engine as set forth in claim 36 further including a third valve reciprocal about a respective axis parallel to the axis of reciprocation of one of the other valves.*

39. A valve train for an internal combustion engine as set forth in claim 38 wherein the axis of reciprocation of the two valves intersect along a line that extends parallel to the plane containing the cylinder bore axis.

*40. A valve train for an internal combustion engine as set forth in claim 39 wherein the valves are operated by direct actuation from the camshaft.*

*41. A valve train for an internal combustion engine as set forth in claim 40 wherein the line intersects the axis of rotation of the camshaft.*

*42. A combustion chamber configuration for an internal combustion engine defined in part by a recess in the lower face of a cylinder head adapted to communicate with a cylinder bore, a first pair of valves serving the same function and lying within said cylinder head on one side of a plane containing the axis of said cylinder bore, a second pair of valves positioned in said cylinder head and lying on the other side of said plane and performing a different function, a fifth valve positioned within said cylinder head on said other side of said plane and spaced further from said plane than said second pair of valves, said fifth valve serving the same function as said second pair of valves, the portion of said cylinder defining the seats of said second pair of valves and said fifth valve forming an inclined area and forming with the portion of said cylinder defining the seats for said one function valve a wedge shaped combustion chamber with the intersection of said cylinder head portions lying on said one side of said plane.*

*43. A combustion chamber configuration for an internal combustion engine as set forth in claim 42 further including a spark plug supported within the cylinder head and disposed away from the intersection of said cylinder head portions and in proximity to the cylinder bore axis.*

*44. A combustion chamber configuration for an internal combustion engine as set forth in claim 42 wherein the recess formed in the cylinder head lies at least in part within the area defined by the cylinder bore, a squish area is formed between the head of a piston reciprocating in the cylinder bore and a surface of the cylinder head facing the cylinder bore on at least one side of said recess.*

*45. A combustion chamber configuration for an internal combustion engine as set forth in claim 44 further including a spark plug supported within the cylinder head and disposed away from the intersection of said cylinder head portions and in proximity to the cylinder bore axis.*

*46. A combustion chamber configuration for an internal combustion engine as set forth in claim 45 wherein the squish area is defined at least in part by a pair of angularly related sections defined outwardly of an area encompassed by a respective one of the second pair of valves and the fifth valve, said angularly related sections being disposed at an angle to each other and at an angle to the plane.*

*47. A combustion chamber configuration for an internal combustion engine as set forth in claim 46 wherein the squish area is further defined by a portion disposed outwardly from the cylinder bore axis from the first pair of the valves and extends generally parallel to the plane.*

*48. A combustion chamber configuration for an internal combustion engine as set forth in claim 45 wherein the squish area is defined by an area disposed outwardly of the first pair of valves from the cylinder bore axis and which extends generally parallel to the plane.*

*49. A valve train for an internal combustion engine as set forth in claim 42 wherein the further including rocker arm means for operating the second pair of valves and the fifth valve from a camshaft.*

*50. A valve train for an internal combustion engine as set forth in claim 49 wherein the rocker arms means comprises a plurality of rocker arms that are inclined at an obtuse angle to the plane.*

*51. A valve train for an internal combustion engine as set forth in claim 50 wherein the rocker arms are pivotally supported outwardly of the point where the camshaft engages the rocker arms.*

*52. A combustion chamber configuration for an internal combustion engine as set forth in claim 42 wherein the second pair of valves reciprocate along axes that are parallel to each other and at an acute angle to the plane, said fifth valve also lying at an acute angle to said plane but at a different acute angle that the acute angle of said second pair of valves.*

*53. A valve train for an internal combustion engine as set forth in claim 52 wherein the axis of reciprocation of the second pair of valves and the fifth valve intersect along a line that extends parallel to the plane containing the cylinder bore axis.*

*54. A valve train for an internal combustion engine as set forth in claim 53 wherein the second pair of valves and the fifth valve are operated by direct actuation from a camshaft.*

*55. A valve train for an internal combustion engine as set forth in claim 54 wherein the line intersects the axis of rotation of the camshaft.*

*56. A combustion chamber configuration for an internal combustion engine as set forth in claim 52 wherein the first pair of valves reciprocate along a parallel axes that lie at an acute angle to the plane on the other side thereof from the second pair of valves and the fifth valve.*

*57. A combustion chamber configuration for an internal combustion engine as set forth in claim 56 wherein the acute angle of the first pair of valves is greater than the angle of the axis of reciprocation of the fifth valve and less than the angle of reciprocation of the second pair of valves.*

*58. A combustion chamber configuration for an internal combustion engine as set forth in claim 56 wherein the acute angle of reciprocation of the first pair of valves is greater than the acute angle of reciprocation of the fifth valve.*

*59. A combustion chamber configuration for an internal combustion engine as set forth in claim 56 wherein the first pair of valves is operated by a first camshaft disposed on one side of the plane and the second pair of valves and fifth valve is operated by a second camshaft disposed on the other side of said plane, the distance between said second camshaft and said plane being less than the distance between said first camshaft and said plane.*

*60. A valve train for an internal combustion engine as set forth in claim 59 further including rocker arm means for operating the valves from the respective camshaft.*

*61. A valve train for an internal combustion engine as set forth in claim 60 wherein the rocker arm means comprises a plurality of rocker arms that are inclined at an obtuse angle to the plane.*

*62. A valve train for an internal combustion engine as set forth in claim 60 wherein the rocker arms are pivotally supported outwardly of the point where the camshaft engages the rocker arm.*

*63. A valve train for an internal combustion engine having a generally concave combustion chamber disposed at one end of said cylinder bore and having an axis, said valve train comprising a plurality of poppet valves having head portions and stem portions, two of said valves being reciprocal about respective axis that are not parallel to each other and each of which is inclined at an acute angle to said axis of said cylinder bore and which intersects a plane containing said cylinder bore axis on the head side of the respective of said valves, the heads of said two valves being disposed substantially on side of said plane, a second pair of poppet valves having their head portions disposed on the other side of said plane, the stems of said first pair of valves intersecting at a line that is disposed at a distance lesser than the distance from the cylinder bore axis than the radius of the cylinder bore.*

*64. A valve train for an internal combustion engine as set forth in claim 63 further including a first camshaft supported on one side of said head for operating the first two of said valves and a second camshaft rotatably supported on the other side of said plane for operating said second pair of poppet valves.*

*65. A valve train for an internal combustion engine as set forth in claim 64 further including a fifth valve performing the same function as the first pair of valves and disposed on said one side of said plane and operated by said first camshaft.*

*66. A valve train for an internal combustion engine as set forth in claim 65 wherein the axis of reciprocation of the first pair of valves and of the fifth valve intersect along a line that extends parallel to the plane containing the cylinder bore axis.*

*67. A valve train for an internal combustion engine as set forth in claim 66 wherein the valves are operated by direct actuation from the camshaft.*

*68. A valve train for an internal combustion engine as set forth in claim 67 wherein the line intersects the axis of rotation of the camshaft.*

*69. A valve train for an internal combustion engine as set forth in claim 66 further including rocker arm means for operating the first pair of valves from a camshaft.*

*70. A valve train for an internal combustion engine as set forth in claim 69 wherein the rocker arm means comprises a plurality of rocker arms that are inclined at an obtuse angle to the plane.*

*71. A valve train for an internal combustion engine as set forth in claim 70 wherein the rocker arms are pivotally supported outwardly of the point where the camshaft engages the rocker arms.*

*72. A valve train for an internal combustion engine as set forth in claim 66 wherein the line of intersection of the axis of reciprocation of the first pair of valves and the fifth valve is spaced at a distance from the plane less than the radius of the cylinder bore.*

*73. A valve train for an internal combustion engine as set forth in claim 72 wherein the first pair of valves and the fifth valve comprise intake valves and the second pair of valves comprise exhaust valves.*

*74. A valve train for an internal combustion engine having a generally concave combustion chamber formed in the lower surface of a cylinder head disposed at one end of a cylinder bore having an axis, said valve train comprising a plurality of poppet valves having head portions and stem portions, at least two of said valves communicating with said combustion chamber of said engine, said two valves being reciprocal about respective axis that are not parallel to each other and each of which is inclined at an acute angle to the axis of the associated cylinder bore and which intersects a plane containing said cylinder axis on the head side of the respective of said valves, an overhead camshaft rotatably supported relative to said cylinder head on the same side of said plane as the heads of said valves, and rocker arm means for operating said two valves from said camshaft, said rocker arm means having a first portion engaged with the tips of said valves and a second portion engaged with said camshaft for pivoting said rocker arms, said second portion being positioned at a point closer to the lower surfaces of said cylinder head than said first portion.*

*75. A cylinder head construction for an internal combustion engine for closing a cylinder bore, a pair of valves supported for reciprocation within said cylinder head and lying substantially on one side of a plane containing the axis of said cylinder bore, a third valve positioned within said cylinder head on said one side of said plane, said valves all serving the same function, coil spring means encircling the stems of said valves for urging said valves toward their closed position, a generally cylindrical spark plug recess formed in said cylinder head by an upstanding wall disposed in proximity to said cylinder bore axis for receiving a spark plug with its gap extending in the combustion chamber defined by said cylinder head and said cylinder bore, the coil spring means associated with said pair of valves lying on opposite sides of said wall and extending inwardly toward said plane relative to said wall and nesting around said wall, the coil spring means associated with the said third valve lying between the coil spring means of said pair of valves and on the same side of said plane and spaced outwardly from said plane and spaced from said wall so that said spark plug recess and said wall is nested between said coil spring means.*

*76. A cylinder head construction for an internal combustion engine for closing a cylinder bore and defining a combustion chamber therewith, a first pair of valves serving the same function and lying within said cylinder head on one side of a plane containing the axis of said cylinder bore, a second pair of valves positioned in said cylinder head and lying substantially on the other side of said plane and performing a different function, a fifth valve positioned within said cylinder head on said other side of said plane and serving the same function as said second pair of valves, a first camshaft rotatably journalled on said one side of said plane and having a pair of lobes for operating said first pair of valves, and a second camshaft rotatably journaled relative to said cylinder head on said other side of said plane and having three lobes for operating said other functions valves, said camshafts each being journaled by a pair of spaced apart bearings disposed on the respective side of*

*said plane, outwardly of this respective lobes of said camshafts, said bearings for each of said camshaft being spaced equal distances.*

*77. A valve train for an internal combustion engine having a generally concave combustion chamber disposed at one end of said cylinder bore and having an axis, said valve train comprising a plurality of poppet valves having head portions and stem portions, two of said valves being reciprocal about respective axis that are not parallel to each other and each of which is included at an acute angle to said axis of said cylinder bore and which intersects a plane containing said cylinder bore axis on the head side of the respective of said valves, the heads of said two valves being disposed substantially on side of said plane, a second pair of poppet valves having their head portions disposed on the other side of said plane, the tips of the stems of said first pair of valves being disposed closer to said plane than the tips of the other of said pair of valves.*

*78. A valve train for an internal combustion engine as set forth in claim 77 further including a fifth poppet valve reciprocating on the same side of the plane as the first pair of poppet valve and inclined at said plane at an acute angle the same as the angle of one of said first pair of valves, the tip of the stem of said fifth valve being at the same distance from said plane as the tips of said first pair of valves.*

*79. A valve train for an internal combustion engine as set forth in claim 78 further including a spark plug disposed within the combustion chamber substantially on the axis of the cylinder bore.*

*80. A valve train for an internal combustion engine comprising a cylinder bore closed by a cylinder head, a camshaft journaled for rotation relative to said cylinder head, three poppet valves operated by said camshaft and supported for reciprocation by said cylinder head, at least two of said valves being reciprocal about parallel axis, the third valve being reciprocal about an axis that is not parallel to the axes of the first two of said valves, said first two of said valves having their heads disposed closer to said cylinder bore than said third valve when said valves are all in their closed position, said valves all serving the same function.*

*81. A valve train for an internal combustion engine as set forth in claim 80 wherein the three poppet valves are intake valves and further including two poppet type exhaust valves disposed on the opposite side of a plane passing through the cylinder bore and passing through at least two of the intake valves.*

*82. A valve train for an internal combustion engine as set forth in claim 81 further including a second camshaft journaled for rotation relative to the cylinder head and operating the exhaust valves.*

*83. A combustion chamber as set forth in claim 4 wherein the intake valves have a smaller head diameter than the exhaust valves.*

*84. A combustion chamber as set forth in claim 4 wherein the pair of intake valves reciprocate about respective parallel axes that lie at the same acute angle to the plane and the third intake valve reciprocates about an acute angle to the plane different than that of the pair of intake valves.*

*85. A combustion chamber configured for an internal combustion engine as set forth in claim 84 wherein the axis of reciprocation of the third intake valve is at a lesser acute angle to the plane than the pair of intake valves.*

*86. A combustion chamber as set forth in claim 4 further including a spark plug contained within the combustion chamber and lying substantially on the axis of the cylinder bore.*

* * * * *

UNITED STATES PATENT AND TRADEMARK OFFICE

CERTIFICATE OF CORRECTION

PATENT NO. : RE. 33,787

DATED : January 7, 1992

INVENTOR(S) : Masaaki Yoshikawa

It is certified that error appears in the above-identified patent and that said Letters Patent is hereby corrected as shown below:

Column 8, lines 29-30, Claim 7, "directy" should read --directly--.
Column 9, line 13, Claim 14, "10" should read --13--.
Column 10, line 61, Claim 34, delete "an" (first occurrence).
Column 11, line 2, Claim 35, after "axis" insert --of--.
Column 11, line 13, Claim 36, delete "an" (first occurrence).
Column 11, line 16, Claim 36, after "valves" insert --,-- (first occurrence).
Column 11, line 17, Claim 36, after "side" delete ",".
Column 11, lines 29-32, Claim 39, Claim should be italicized.
Column 12, line 24, Claim 49, delete "wherein the".
Column 12, line 40, Claim 52, "that" should read --than--.
Column 15, line 22, Claim 78, "valve" should read --valves--.

Signed and Sealed this

Seventh Day of December, 1993

*Attest:*

*Attesting Officer*

Bruce Lehman

BRUCE LEHMAN

*Commissioner of Patents and Trademarks*